US007999419B2

(12) United States Patent

Drane et al.

(10) Patent No.: US 7,999,419 B2
(45) Date of Patent: Aug. 16, 2011

(54) WHILE-IN-USE ELECTRICAL BOX THAT SHUTS POWER OFF TO THE DEVICE WHEN COVER IS OPEN

(75) Inventors: Mark R. Drane, Germantown, TN (US); Joey D. Magno, Jr., Cordova, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 361 days.

(21) Appl. No.: 12/391,317

(22) Filed: Feb. 24, 2009

(65) Prior Publication Data

US 2009/0236918 A1 Sep. 24, 2009

Related U.S. Application Data

(60) Provisional application No. 61/070,079, filed on Mar. 20, 2008.

(51) Int. Cl.
*H02H 11/00* (2006.01)

(52) U.S. Cl. ........................................................ 307/326

(58) Field of Classification Search .................. 307/326; 174/50, 53, 66; 220/3.2, 3.3; 361/600; 439/535
See application file for complete search history.

(56) References Cited

U.S. PATENT DOCUMENTS

| | | | | |
|---|---|---|---|---|
| 1,463,908 | A | 8/1923 | Platt | |
| 2,408,213 | A | 9/1946 | Huber | |
| 2,876,856 | A | 3/1959 | Greene | |
| 3,621,165 | A | 11/1971 | Stone | |
| 4,059,739 | A * | 11/1977 | Girismen | 200/51.09 |
| 4,260,904 | A | 4/1981 | Horie et al. | |
| 4,655,634 | A | 4/1987 | Loy et al. | |
| 4,800,460 | A | 1/1989 | Yin | |
| 4,861,948 | A * | 8/1989 | Fogleman, Sr. | 200/5 B |
| 4,984,982 | A | 1/1991 | Brownlie et al. | |
| 5,077,631 | A | 12/1991 | Cleary | |
| 5,212,359 | A | 5/1993 | Morganti | |
| 5,218,169 | A * | 6/1993 | Riceman | 174/67 |
| 5,432,309 | A | 7/1995 | Takeuchi et al. | |
| 5,485,356 | A | 1/1996 | Nguyen | |
| 5,709,156 | A | 1/1998 | Gevaert et al. | |
| 5,914,460 | A | 6/1999 | Mowery et al. | |
| 6,028,267 | A | 2/2000 | Byrne | |
| 6,127,630 | A | 10/2000 | McKenzie et al. | |
| 6,329,595 | B1 | 12/2001 | Roberts | |
| D472,213 | S | 3/2003 | Byrne | |
| 6,724,291 | B1 | 4/2004 | Byaliy et al. | |
| 7,227,079 | B2 | 6/2007 | Noest et al. | |
| 7,762,213 | B2 * | 7/2010 | Cook et al. | 119/166 |
| 2006/0096775 | A1 | 5/2006 | Noest et al. | |

* cited by examiner

*Primary Examiner* — Albert W Paladini
(74) *Attorney, Agent, or Firm* — Hoffmann & Baron, LLP

(57) ABSTRACT

The present invention is directed to a "while-in-use" electrical device cover that shuts the power off to the device when the cover is open. The power is re-activated when the cover is closed using a cam device.

10 Claims, 11 Drawing Sheets

WHILE-IN-USE ELECTRICAL BOX THAT SHUTS POWER OFF TO THE DEVICE WHEN COVER IS OPEN

CROSS-REFERENCE TO RELATED APPLICATION

This application claims priority to U.S. Provisional Application No. 61/070,079, filed on Mar. 20, 2008, which is in incorporated herein.

FIELD OF THE INVENTION

The present invention relates generally to a box for housing electrical termination devices such as jacks and receptacles. More particularly, the present invention relates to an integral hingable box and cover to allow users easy access and an automatic power safety switch on/off which is connected thereto.

BACKGROUND OF THE INVENTION

Electrical boxes and housings are typically used to house electrical termination devices such as electrical receptacles and data/communication jacks which terminate wires running thereinto. These termination devices are provided so as to permit connection of electrical wires and cables terminated by complimentary termination devices such as plugs and the like.

With many electrical boxes, especially those which are used to house termination devices positioned within a floor or wall, it is desirable to construct the box to provide easy access for inserting the plug yet is not interfering.

A typical exterior electrical box has a cover which is pivoted to an open position to reveal the various power and signal components which are terminated therein.

In a typical electrical box power is continually supplied to the receptacle within the box. If covered, the user must open the cover, pull the plug into the box, locate the receptacle, and properly align and connect the plug to the receptacle in the confined space of the box. All this occurs with minimal viewing ability to assist in confirming the connection without damage or injury. There is no provision to shut the power off using the action of the cover.

It is, therefore, desirable to provide an electrical box which allows for easy access and viewability of the receptacle and connections therein, and provide a safety mechanism which will cut the power when the cover is open and provide power when the cover is closed.

SUMMARY OF THE INVENTION

The present invention is directed to a "while-in-use" electrical device cover that shuts the power off to the device when the cover is open. The power is re-activated when the cover is closed using a cam device.

In one embodiment of the invention, the electrical device is a flush mount device with the box recessed and the receptacle pivots along with the cover. The electrical interlock provides power to the receptacle when the cover/receptacle is in the closed position and the power is terminated when the cover/receptacle is in the open position.

In another embodiment of the invention, the electrical device provides for a receptacle fixed inside the box with only the cover pivotable open. Power is terminated when the cover is in the open position. Power is restored upon closure of the cover.

BRIEF DESCRIPTION OF THE DRAWINGS

FIG. 5 is a side sectional view of the box of FIG. 2 showing the cam operated micro switch power-on.

FIG. 34 is a perspective showing of an electrical box assembly of the present invention.

DETAILED DESCRIPTION OF THE PREFERRED EMBODIMENT

Figure 1:
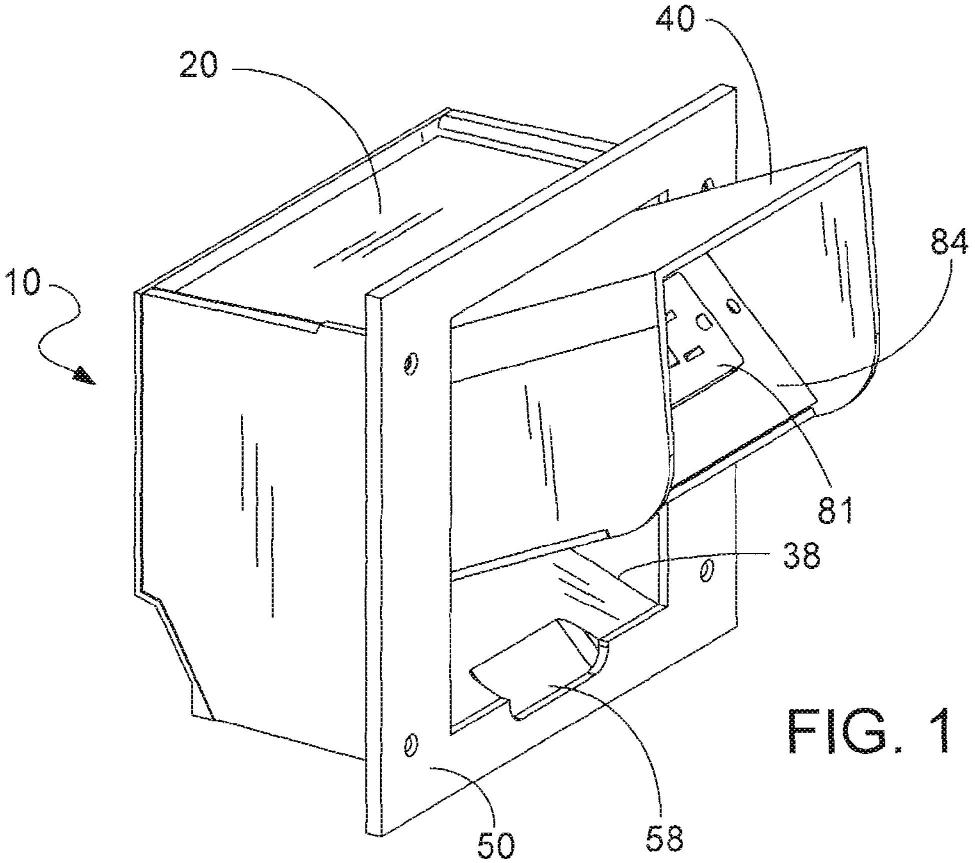
FIG. 1 is a perspective showing of the electrical box assembly of the present invention.
Figure 2:
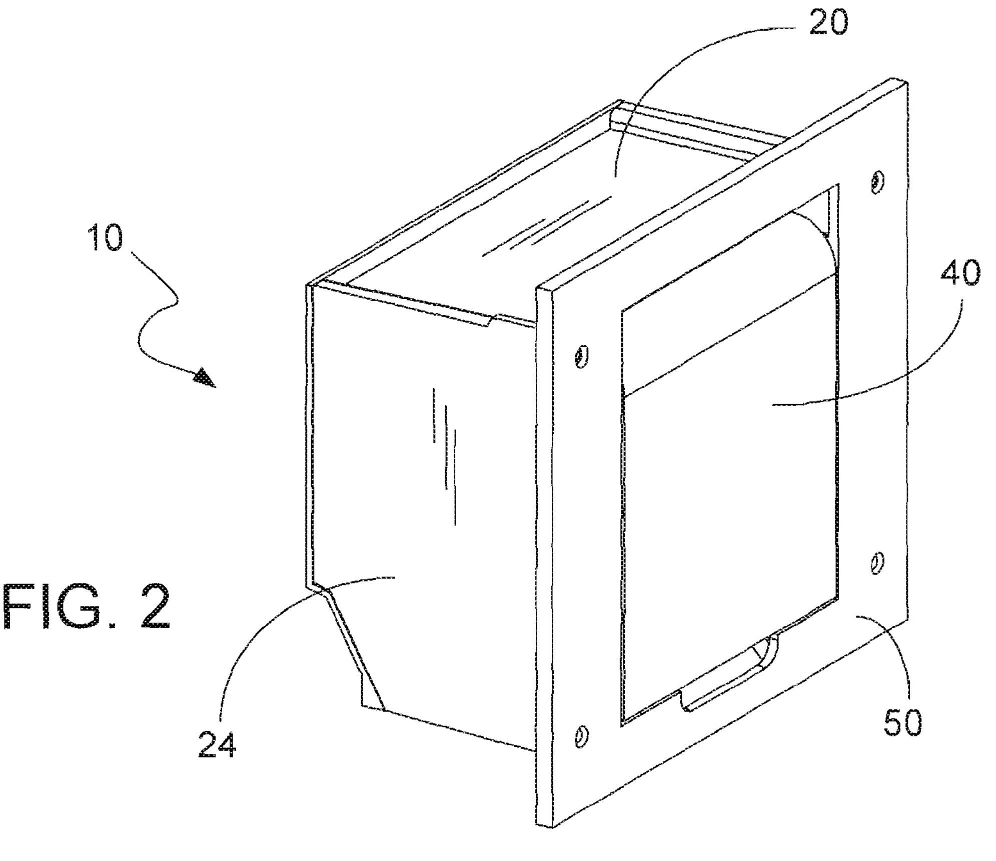
FIG. 2 is a perspective showing of the electrical box with the cover in the closed position of FIG. 1.

The present invention is directed to an outdoor electrical box assembly which provides an electrical interlock such that power to the receptacle is terminated when the cover is in the opened position. The receptacle can be attached to the cover or attached to the box interior. The box can be a flush mount box assembly or exterior box mount.

Referring now to FIGS. 1-13, the box assembly 10 of the present invention is shown. Box assembly 10 includes an exterior box housing 20, an interior box housing 30, a cover 40, and locking flange 50 which secures the cover 40 to box housings 20 and 30. Exterior housing 20 is a generally rectangular box-like member having a removable back wall 60, a pair of sidewalls 24, upper sidewall 26, lower sidewall 28, and an open front 12 which cover 40 is positioned therein. The open front 12 is defined by sidewalls 24, upper sidewall 26, and lower sidewall 28. The open front 12 is lined about the perimeter by inner flange 52. As is well known, exterior box housing 20 and interior box housing 30 may be formed of a variety of materials including plastic or metal.

Figure 3:
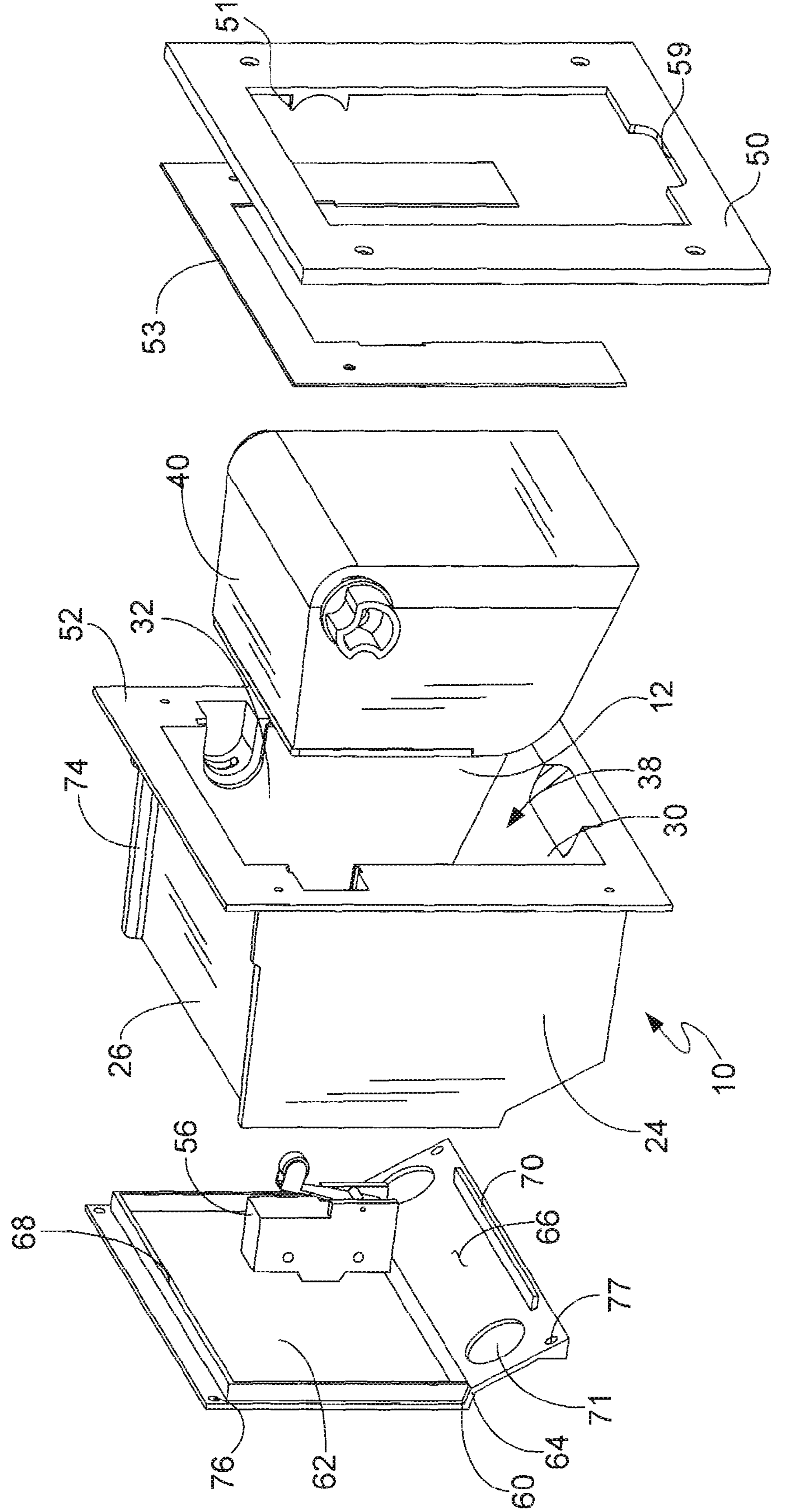
FIG. 3 is a front side exploded view of the electrical box of FIG. 1.
Figure 4:
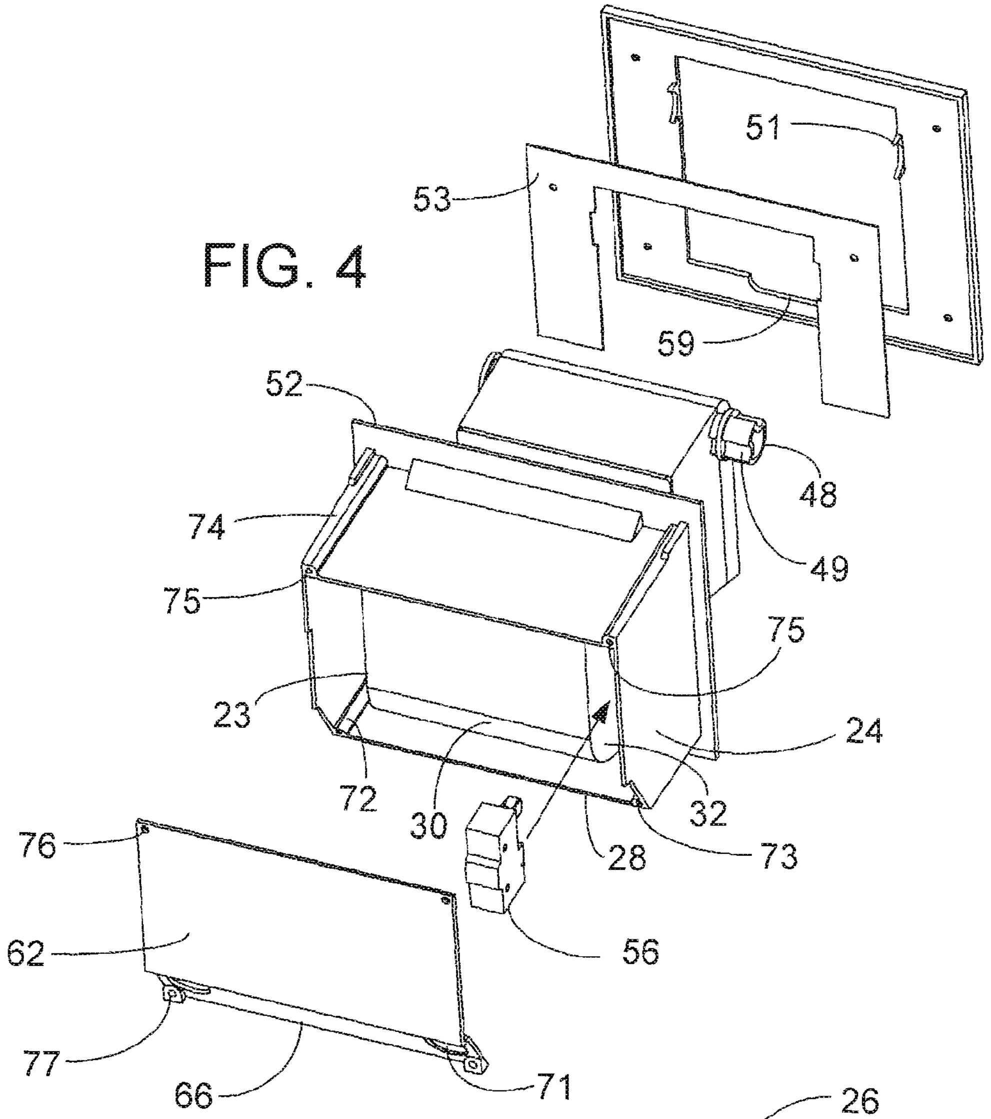
FIG. 4 is a rear side exploded view of the electrical box of FIG. 1.

As shown in FIGS. 3-4, exterior box housing 20 is generally square with a pair of mirror image sidewalls 24 which are rectangular with a back corner of the rectangle cut-off. One edge of the sidewalls 24 is attached to a substantially planar inner flange 52 which extends perpendicular from the sidewalls 24. The pair of sidewalls 24 are attached to an upper sidewall 26. The sidewalls 24 extend above the upper sidewall 26 such that the upper sidewall 26 is inset from a free edge of each sidewall 24. The upper sidewall 26 is generally rectangular in shape and has four edges. Each edge is attached to perpendicularly extending members, such as sidewalls 24, flange 52 or back wall 60. The attachment point between the sidewalls 24 and the upper sidewall 26 includes channels 74 with holes 75. The channels 74 provides for attachment of the removable back wall 60 to the remaining exterior box housing 20. Lower sidewall 28 is generally rectangular and is attached on two opposing edges by the sidewalls 24. At the joint where the lower sidewall 28 edge and each sidewall 24 edge meets is a channel 72 including a hole 73. This channel 72 provides a means of attaching the removable back wail 60 to the remaining box housing 20. The lower sidewall 28 is also attached to the flange 52 which extends perpendicular to the lower sidewall 28. In this embodiment, the lower sidewall 28 is shorter than the upper sidewall 26. Additionally, the channel 72 is shorter than the channels 74.

Figure 8:
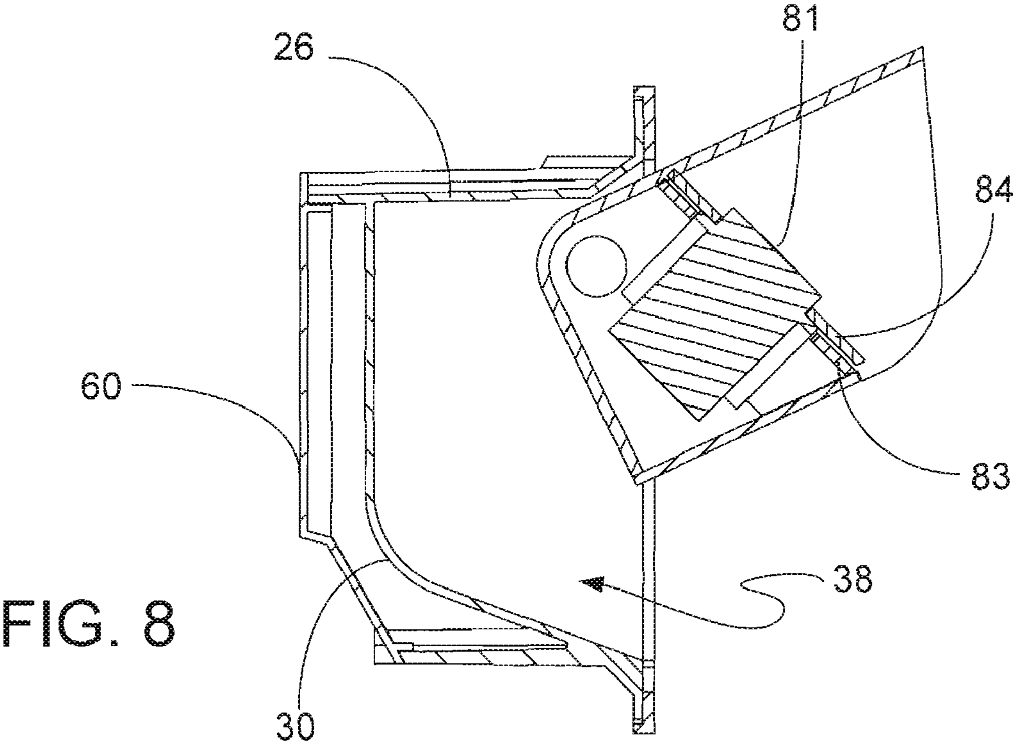
FIG. 8 is a side sectional view of the box of FIG. 7 showing the GFCI device therein.

FIGS. 3, 4 and 8 show removable back wall 60 including a rectangular portion 62 and a lower lip or ridge portion 64 extending perpendicular to the rectangular portion 62. Lower ridge portion 64 is attached to angular portion 66 at an angle less than 90. The rectangular portion 62 includes a rim 68 which is rectangular in shape and protrudes perpendicularly outward from the back wall 60. Rim 68 is inset from the edges of the rectangular portion 62. A leveling bar 70 protrudes outwardly from the angled portion 66. The rim 68 and bar 70 assist with proper positioning and securement of the back wall 60 to the sidewalls 24, 26 and 28. The rectangular portion 62 includes holes 76 which align with holes 75 to provide securement of the back wall 60 to the sidewalls 24 with fasteners. Additionally, holes 77 extends through the angled portion 66 and aligns with holes 73 of the sidewalls 24 to provide securement therewith fasteners. Angular portion 66 also includes knock-outs 71 for power supply lines to extend from the floor or wall through to the box assembly 10.

Figure 5:
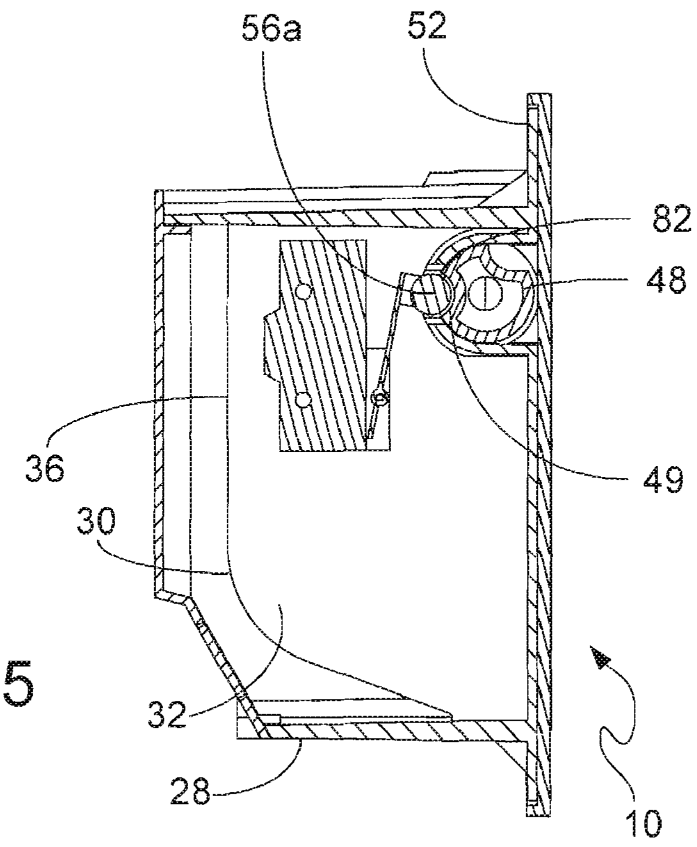

FIGS. 4 and 5 show exterior box housing 20 encompassing interior box housing 30. Interior box housing 30 includes a pair of interior sidewalls 32 and an interior back wall 36. One edge of each interior sidewall 32 and one edge of interior back wall 36 is attached to upper wall 26 on the lower surface. Interior box is generally a rectangular box like member with a curved back wall 36 which is continuous to form both the back wall and the bottom wall of the interior box 30.

As shown in FIGS. 3, 4, 8 and 9 interior back wall 36 is curved at an obtused angle. Interior back, wall 36 is attached to the upper sidewall 26 the interior sidewalls 32, and either to flange 52 as shown in FIG. 5, or lower wall 28 as shown in FIG. 8. The interior sidewalls 32, upper sidewall 26 and interior wall 30 define the box interior 38. The box interior 38 is defined by the interior back wall 36, two interior sidewalls 32 attached to the interior back wall 36 and a portion of upper sidewall 26. One side of each interior sidewalls 32 has a curved portion to mirror the curvature of the interior back wall 36. The interior sidewalls 32 are set a distance in from the sidewalls 24 to provide a space 23 between the interior sidewall 22 and sidewalls 24 for a switch 56 to be placed therein. This space 23 provides room for the switch 56 and electrical wires to extend through to supply to the interior 38 of the box assembly 10.

Figure 9:
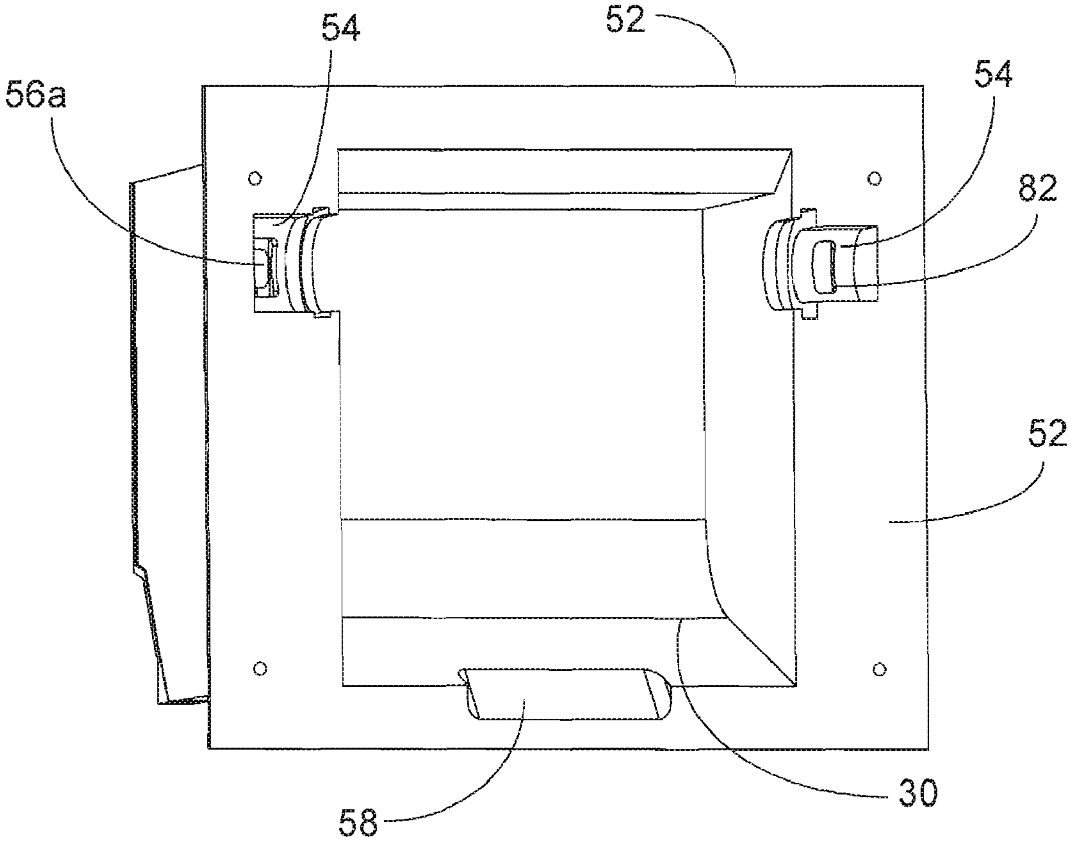
FIG. 9 is a front perspective view of the interior of the base of the box assembly of FIG. 1.

FIG. 9 shows flange 52 extends the perimeter about open front 12. Flange 52 is substantially planar with two opposing cam receiving slots 54 for attachment of the cover 40, access to electrical wire and micro switch. Flange 52 also includes divot 58 for the wires of a plug to extend therethrough when the cover 40 is in the closed position, see FIG. 12.

Figure 13:
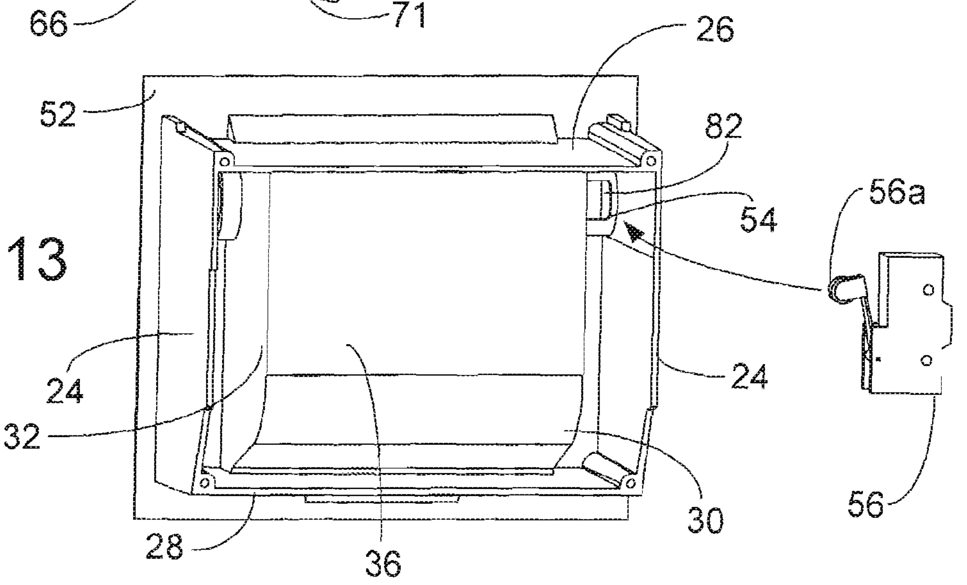
FIG. 13 is a perspective showing of the rearview of a portion of the box assembly of FIG. 1.
Figure 6:
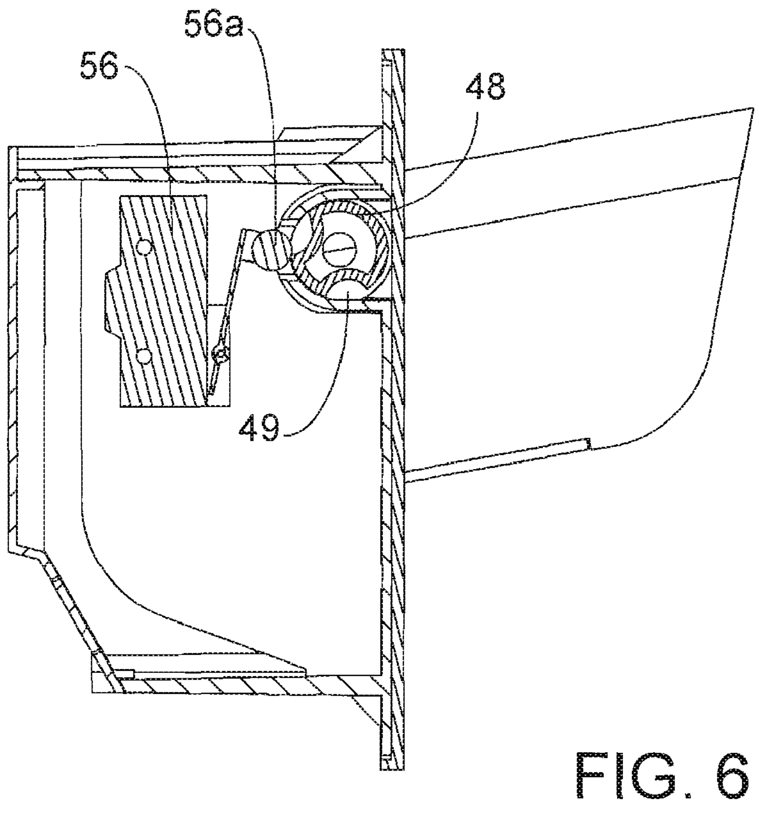
FIG. 6 is a side sectional view of the box of FIG. 1 showing the cam operated micro switch power-off.
Figure 10:
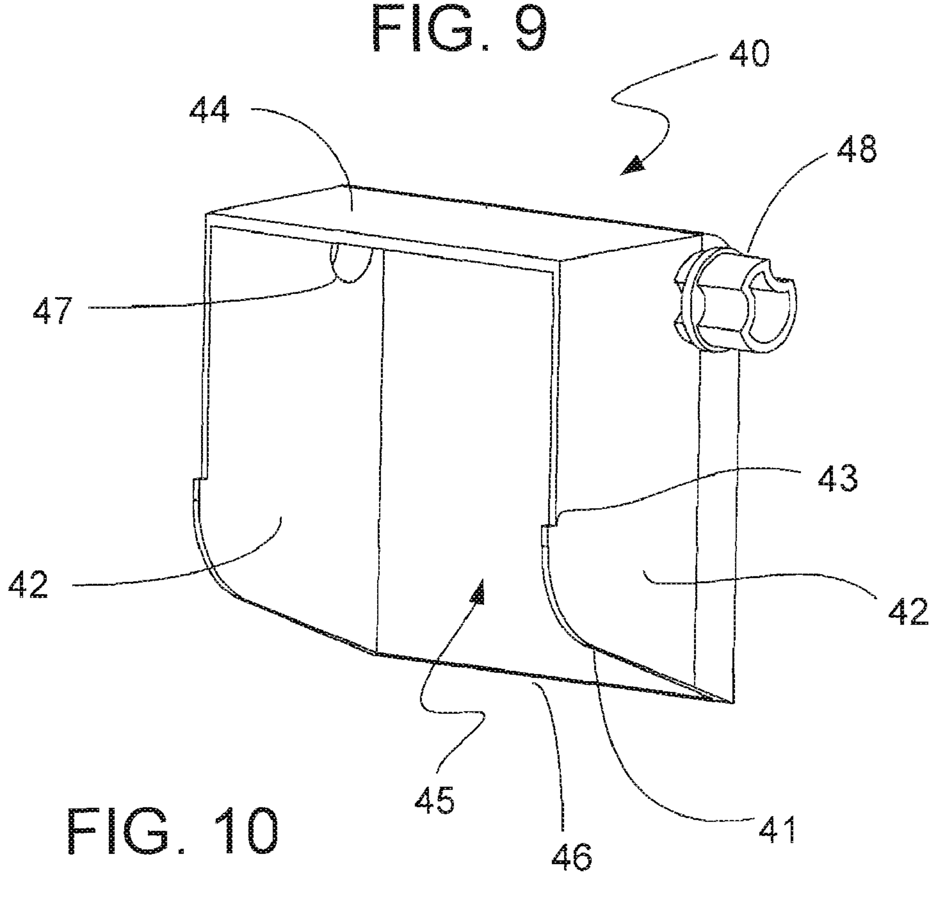
FIG. 10 is a rear perspective view of the interior of the cover of the box assembly of FIG. 1.
Figure 11:
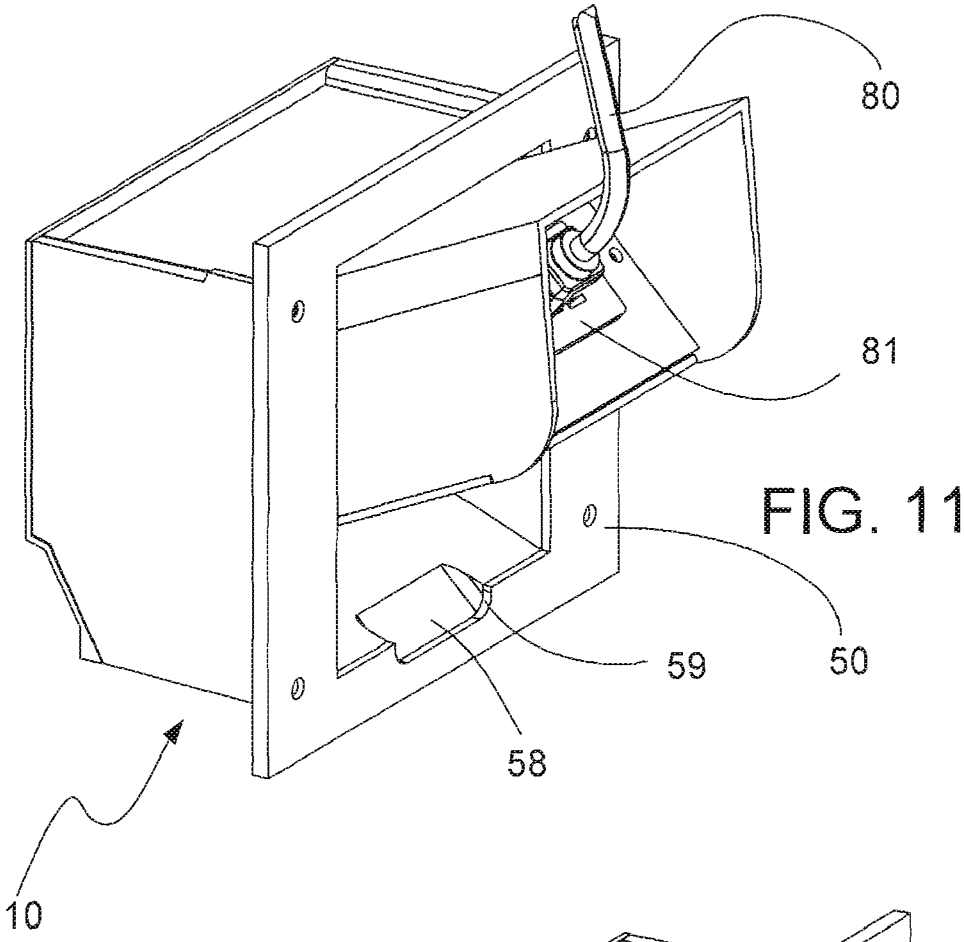
FIG. 11 is a perspective showing of FIG. 2 including a power cord plugged into the assembly.

As shown in FIGS. 3-5 cover 40 is generally a rectangular shaped geometry and designed to seat inside box interior 38, FIG. 10 shows cover 40 including a pair of cover sidewalls 42, a cover top wall 44 and a cover face plate 46. The cover sidewalls 42, top wall 44 and face plate 46 define a cover interior 45 of which a receptacle is attached and placed therein as shown in FIG. 11. The cover side walls 42 are generally rectangular having an angled bottom edge 41. Additionally, the bottom edge 41 is attached to an adjacent side edge in a curved manner. Additionally, one side edge includes a protruding notch 43 to provide attachment of the receptacle 81. Sidewalls 42 includes a hole 47 near the corner where the top wall 44 and face plate 46 connect. The hole 47 is for electrical wires to extend therethrough. On the opposite side of the hole 47 is cam 48. Cam 48 seats in cam receiving slot 54 of the exterior box housing 20 to attach cover 40 to exterior box housing 20. Cam 48 is generally a cylindrical shape protruding perpendicular from the exterior surface of the sidewalls 42. Cam 48 includes two cam divots 49 which controls the status of switch 56, FIG. 13 shows the wheel 56*a* of the switch 56 which is inserted into rectangular hole 82 in the receiving slot 54 of the frame 52. FIG. 5 shows the wheel 56*a* of the switch inserted into rectangular hole 82 and in contact with cam 48. When the wheel 56*a* of switch 56 extends into cam divot 49, the switch 56 is in the on-position and this allows power to be supplied to receptacle 81 (FIG. 5). When the wheel 56*a* of switch 56 is not in cam divot 49 and is on the exterior cylindrical surface of cam 48 the switch is in the off-position and this prevents power from being supplied to the receptacle 81 (FIG. 6).

The receptacle 81 is placed within the cover 40 at an angle, as shown in FIGS. 1, 8 and 11. The angled placement of the receptacle 81 provides for easier access to the receptacle 81 when the cover 40 is in the open position. A receptacle mounting bracket 83 engages with notch 43 of the cover 40 to seat the receptacle 83 within the cover 40. A faceplate 84 is placed over the receptacle mounting bracket 83 and secured to the mounting bracket 83 to secure the receptacle 81 within the cover 40.

Box assembly 10 is assembled by attaching the cover 40 to the exterior box housing 20 and interior box housing 30. The cam 48 of the cover 40 is placed into the cam receiving slot 54. Then locking flange 50 is placed over cover flange 52 and fasteners are used to secure locking flange 50 to flange 52. Flange 50 covers the cam receiving slot 54 to prevent cam 48 from exiting the slot. Locking flange 50 is a rectangular strip of planar material which covers the entire inner flange 52. Locking flange 50 includes two inner extending semi-circular prongs 51 for aligning and engaging with cam 48 to secure cover 40 in place. Locking flange 50 is removable and can be replaced if the user wants a different color, texture or material. Additionally, gasket 53 may be placed between flange 52 and locking flange 50. Locking flange 50 includes cut-out 59 which corresponds with divot 58 of the inner flange 52 to allow for egress of wires 80 when the cover 40 is in the closed position.

Figure 7:
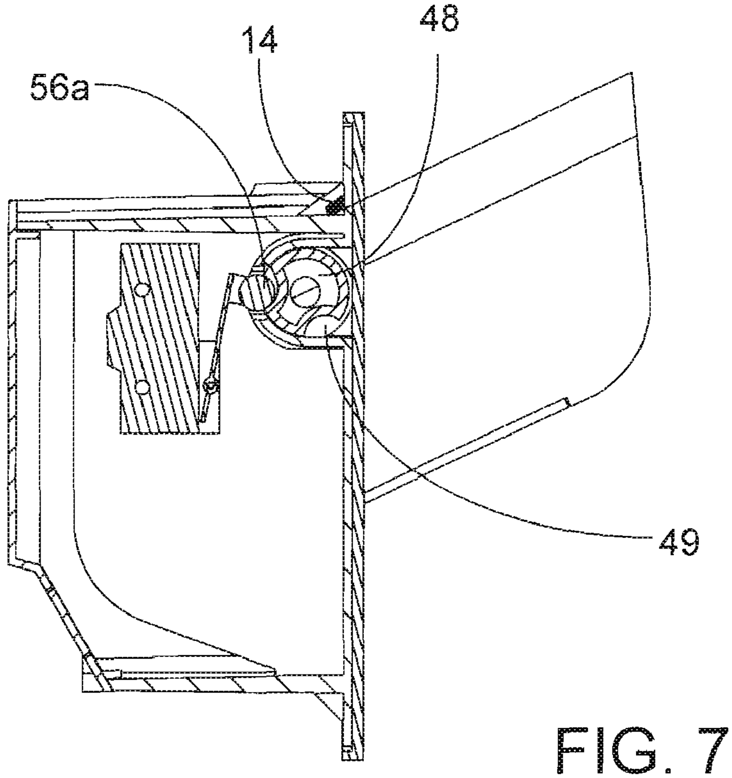
FIG. 7 is a side sectional view of the box of FIG. 1 showing the cam operated micro switch power-off.

FIG. 5 shows the box assembly 10 completely assembled and the switch 56 engaged with, cam 48. The switch 56 is in the power-on position, supplying power to the receptacle when the cover 40 is closed. FIG. 6 shows the cover 40 in an opened position, and the switch 56 is in the power-off position. FIG. 7 shows the switch 56 in one of the cam divots 49 allowing the switch to provide power to the receptacles. FIG. 7 shows the cam in power-on position to allow the user to test GFCI circuit. In this position the cover 40 must be forced up against a spring load 14 but cover 40 cannot remain in this position absent a force overcoming spring load 14.

While in the preferred embodiment, cam 48 rotates along with cover 40 while switch 56 remains relatively stationary, the opposite is also likely. In other words, switch 56 (or a component thereof) can be configured to rotate along with cover 40 while cam 48 remains substantially, if not wholly, stationary.

Having described the components of the box of the present invention, its operation may now be described. The box assembly 10, as described in FIG. 1, may be inserted into a floor or wall through which wires and cables (not shown) are typically run. Wires and cables are extended through the knockouts 71 of the back wall 60. The wires are then attached to the switch 56 and receptacle. The back wall 60 is secured to exterior box 20. The box 10 assembly may be inserted into the floor or wall with or without the cover assembly attached thereto. If the housing 10 is inserted first, the cover 40 may be positioned subsequently. Once the cover 40 is attached, by inserting cam 48 into cam slot 54, the flange 50, or gasket 53 and flange 50 are attached to the flange 52 and secured thereto. The flange 50 provides a smooth transition to a wall, carpet or other flooring placed over the floor or wall.

Figure 12:
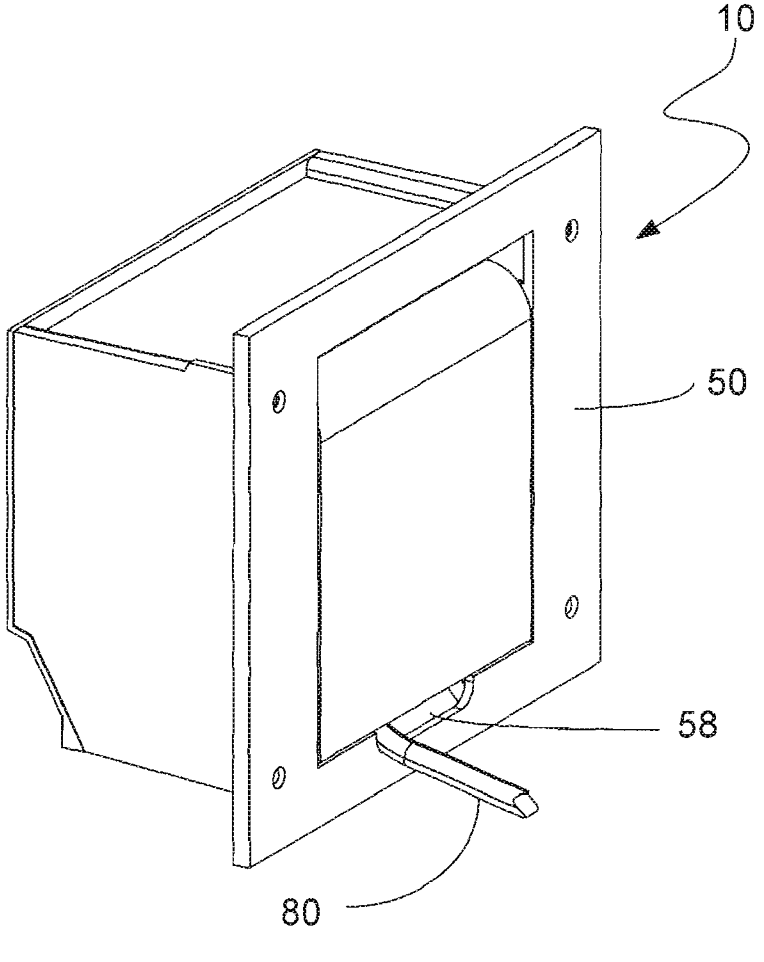
FIG. 12 is a perspective showing of FIG. 1 including a power cord plugged into the assembly and exiting therefrom.

Referring now to FIGS. 1, 2, 11 and 12, in order to connect a terminated electrical wire 80 to the receptacles 81 and jacks supported within box assembly 10, the cover 40 is pivotally moved to an open position as shown in FIG. 11. Connections can now be made in the conventional fashion to the receptacles 81 and jacks located within the cover 40. The power supply is in the off position when the cover 40 is open. After the connections are made, the cover 40 can be pivotally closed to lie flush with the floor or wall as shown in FIG. 12. When the cover 40 is closed, the power supply is in the power-on position. Divot 58 and cut-out 59 accommodates the egress of the terminated wires 80 from the box assembly 10.

Additionally the cover 40 can be removed and replaced. The cover can be replaced with a cover of a different color, different texture or different material. Further, if the cover is damaged it may be replaced. Similarly the locking flange 50 may be removed and replaced to match the cover 40 and floor or wall material of which it is installed in.

An alternative embodiment is box 100 which is similar to box 10 but instead of having the receptacle attached to the cover and moving with the cover, the receptacle is located in the box and the cover moves freely. The power supply is still provided to the receptacle by the cam and controlled by the position of the cover, as in box 10. Additionally, box 100 provides a light 201 which is a sensor activated light that can be activated by motion, light, or a combination.

Specifically, referring now to FIGS. 14-22, the box assembly 100 of the present invention is shown. Box assembly 100 includes a box housing 200, and a cover 400, and face plate 500 which encloses the receptacle within the box housing 200. Face plate 500 is planar with cut outs to access the receptacle and the light. Box housing 200 is a generally rectangular box-like member having a back wall 600, a pair of sidewalls 240, upper sidewall 260, lower sidewall 280, and an open front 120. The upper sidewall 260 has a stepped geometry having a top portion 260*a*, a riser 260*b* and a lower portion 260*c*. This allows the cover 400 to open and slide over the top portion 260*a* and riser 260*b* without interference. The cover 400 is attached to the pair of sidewalls 240. The open front 120 is defined by sidewalls 240, upper sidewall 260 and lower sidewall 280. The open front 120 has an inner flange 520 extending parallel to the open front 120 and perpendicular from the lower sidewall 280. The inner flange 520 includes a locking hole which aligns with a locking hole of the cover 400 to provide a means of locking the cover to the box. The lower sidewall 280 includes holes for the wires to exit therethrough. The back wall 600 includes holes for a fastener to attach the box to a wall or other support member. The back wall 600 also includes an electrical wire entrance for wires to supply power to the receptacle. As is well known, box housing 200 may be formed of a variety of materials including plastic or metal.

Figure 14:
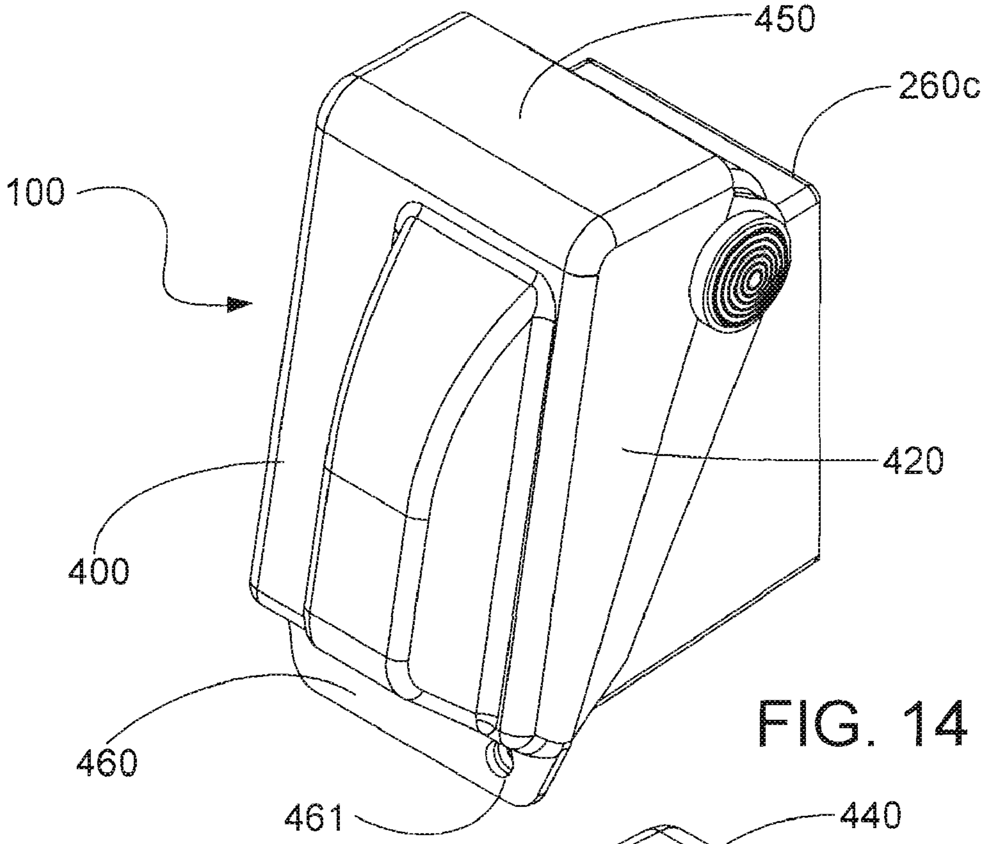
Figure 15:
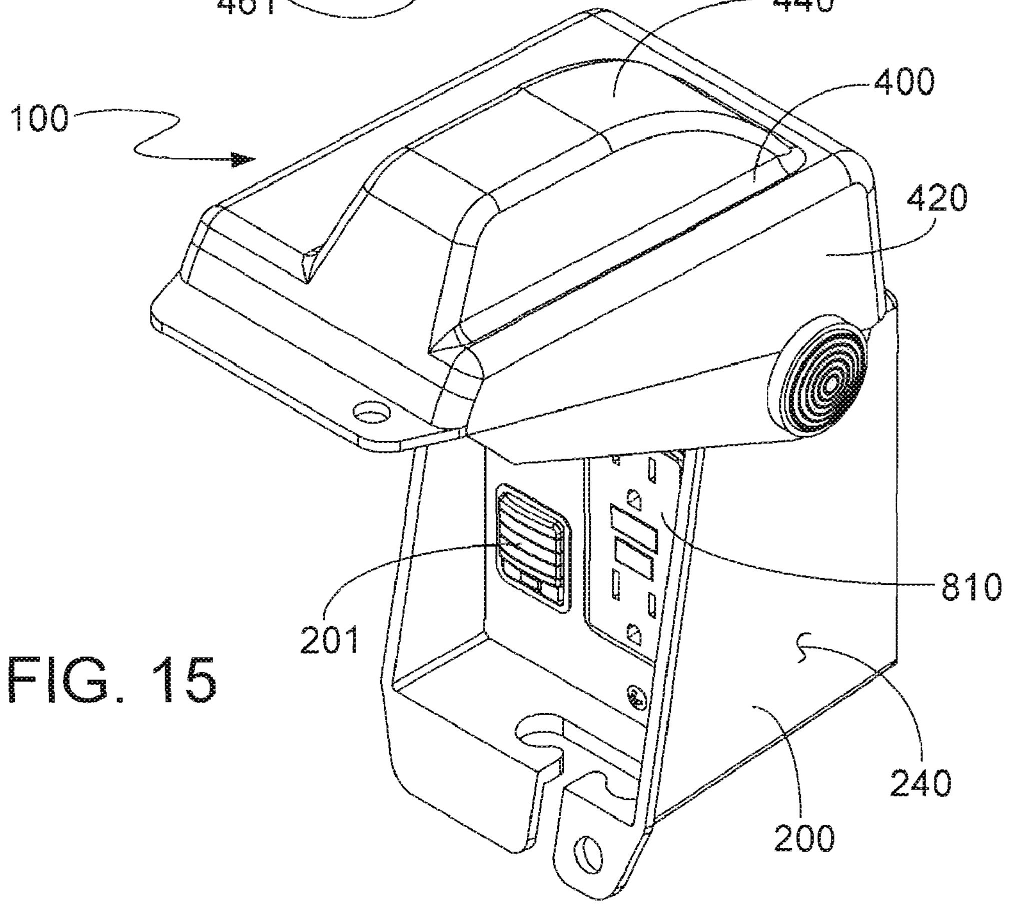
FIG. 15 is a perspective showing of an electrical box assembly of FIG. 14 with the cover open and power supply off.
Figure 17:
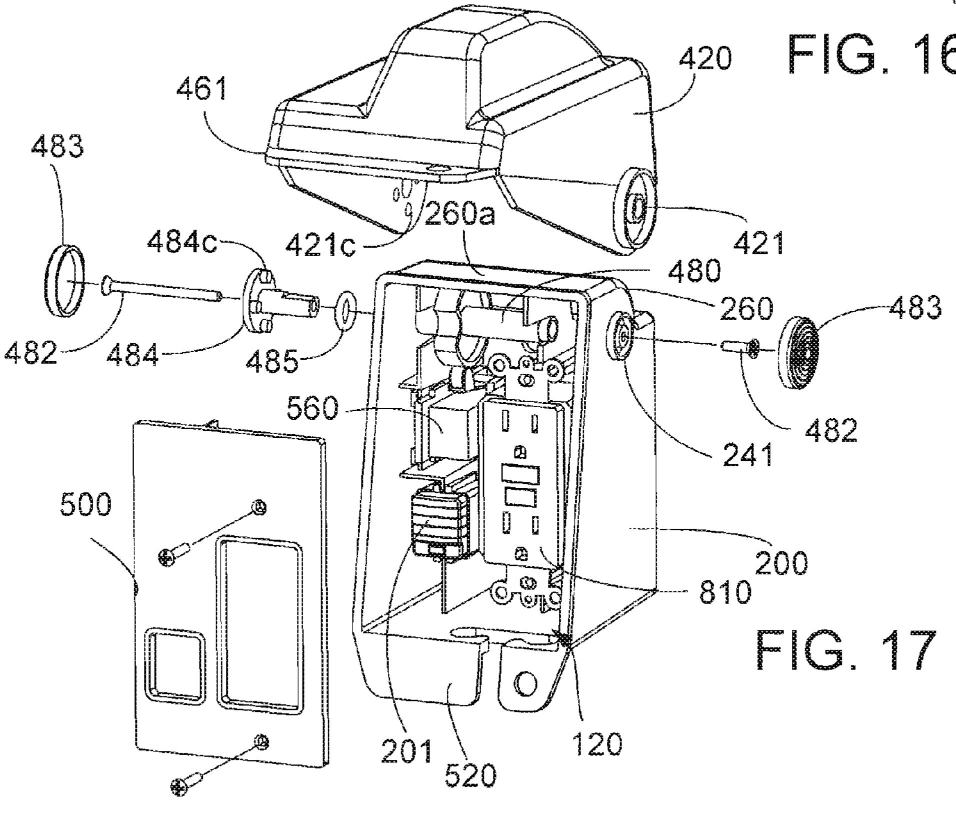
FIG. 17 is an exploded perspective showing of an electrical box assembly of FIG. 14.
Figure 18:
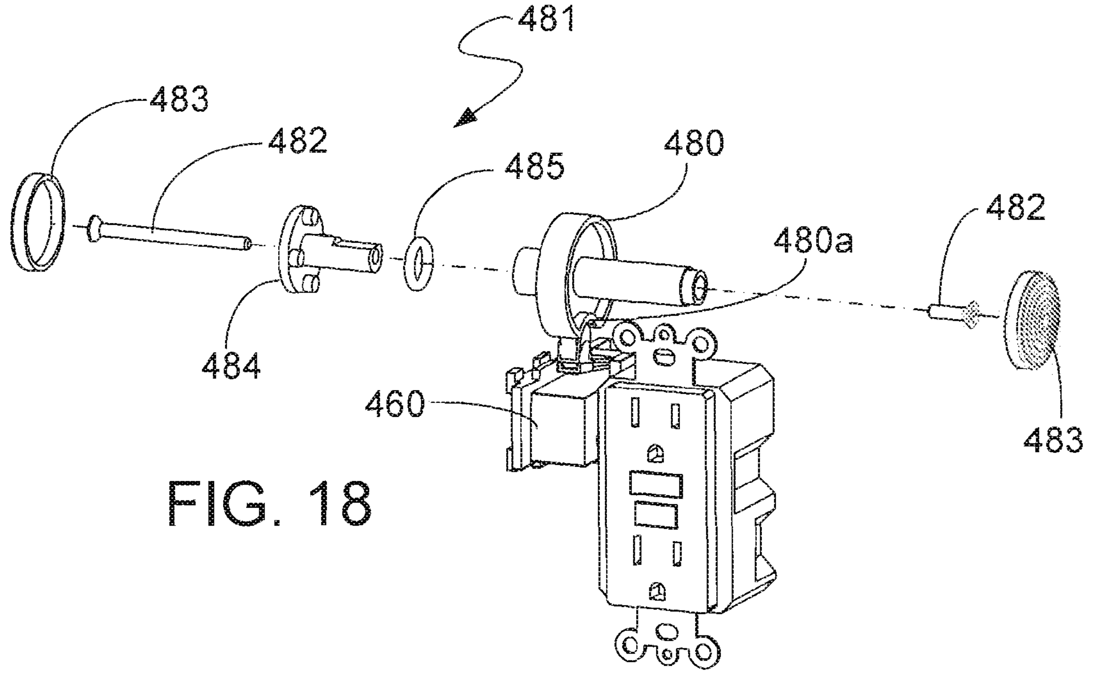
FIG. 18 is an exploded perspective showing of the cam switch and receptacle of FIG. 17.
Figure 19:
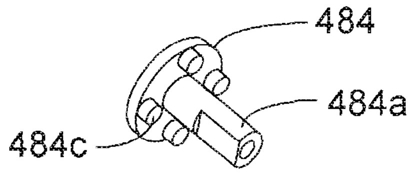
FIG. 19 is a perspective showing of the cover connector of FIG. 17.
Figure 20:
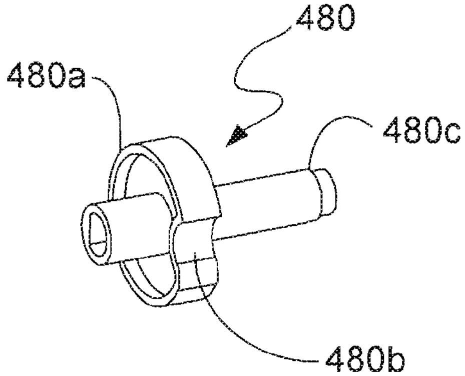
FIG. 20 is a perspective showing of the cam switch of FIG. 17.
Figure 21:
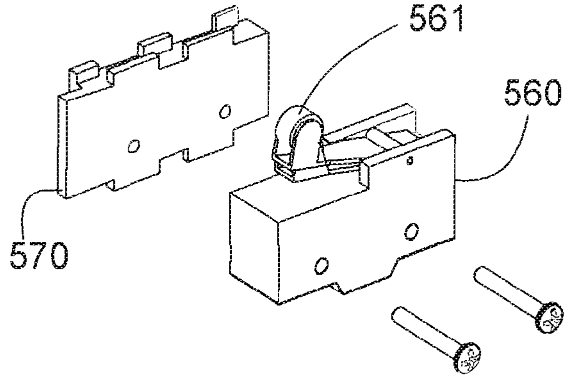
FIG. 21 is a perspective showing of the electrical switch of FIG. 17.
Figure 22:
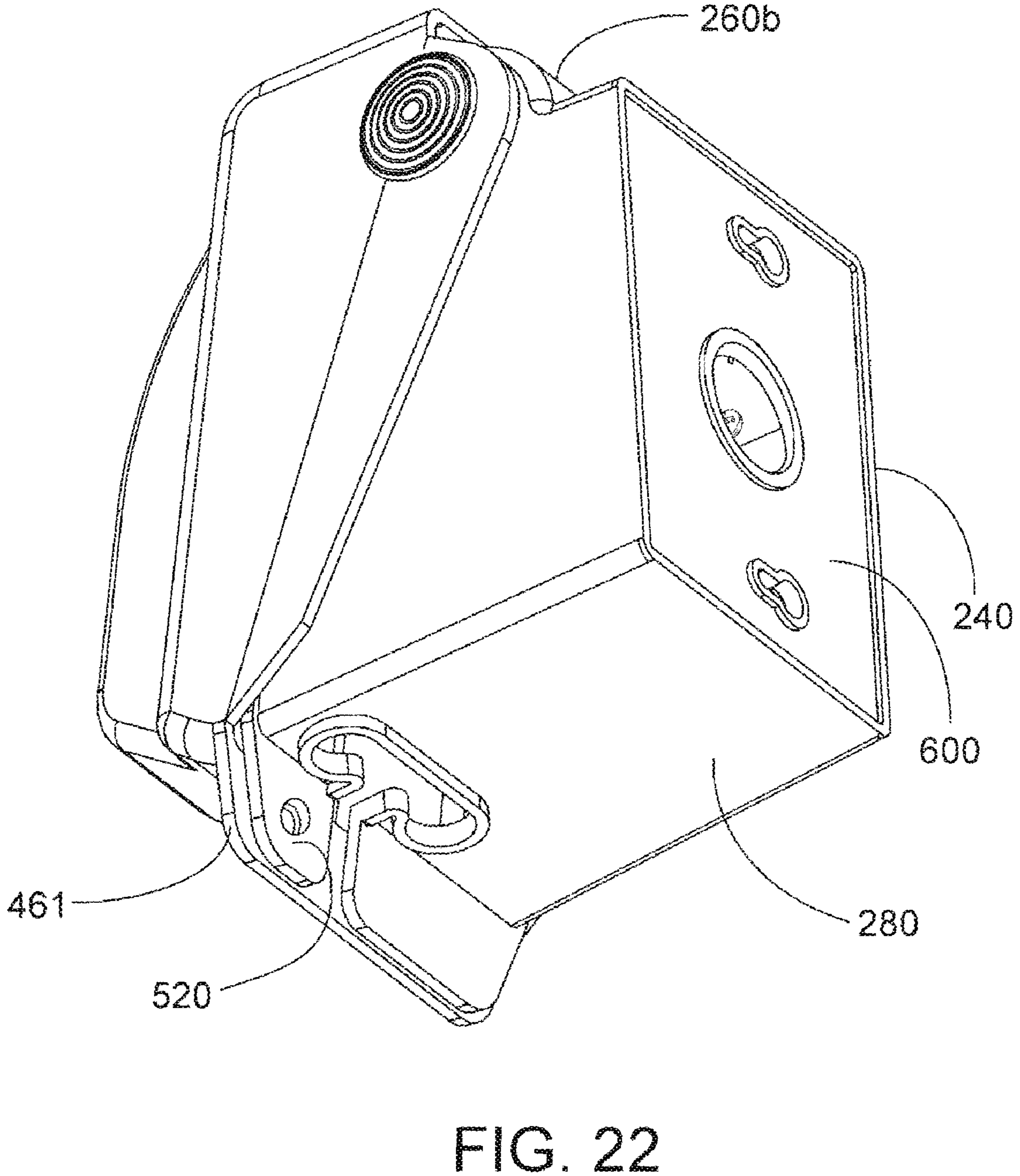
FIG. 22 is a perspective showing of the electrical box assembly of FIG. 14.

As shown in FIGS. 14, 15 and 23 cover 400 is generally a rectangular shaped geometry and designed to attach to box 200 by sidewalls 240. Cover 400 includes a pair of triangular cover sidewalls 420, a cover front wall 440, a top wall 450 and a bottom wall 460. The sidewalls 420 include a hinged attachment member 421 which attach to the sidewall 240 attachment member 241. The cam control member 481 extends through the hinged attachment member 421 and sidewall attachment member 241. The cam control member 481 includes a fastening members 482, cap 483, cam 480, cover connector 484 and o-ring 485 as shown in FIG. 17. The cover bottom wall 460 includes a flange 461 which extends downward and aligns with flange 520 when the cover 400 is in the closed position. The flanges 520 and 461 provide a hole for a lock to extend therethrough and lock the box and cover in the closed position. The front wall 440 is molded to provide additional room within the box cavity for wire plugs to extend into.

As shown in FIGS. 17-21, the box 200 holds the receptacle 830, switch 560 and light 201 therein. The switch 560 is controlled by the cam control member 483. The switch 560 includes a wheel 561. The wheel 561 engages with cam 480. Cam 480 includes a shaft 480*c* with a D-shaped hole, a cam wheel 480*a* and a divot 480*b* in the cam wheel 480*a*. The wheel 563 of the switch 560 rides on the cam wheel 480*a* and when the switch wheel 561 enters the divot 480*b* the switch is in the power-on mode and power is supplied by the switch to the receptacle. This power-on mode is accomplished when the cover is in the closed position. When the switch wheel 563 is engaged with the remaining cam wheel 480*a*, not divot 480*b*, the switch is in the power-off mode and the switch prevents power supply to the receptacles. The power-off mode is accomplished when the cover is in the open position.

Cam 480 is attached to cover connector 484. Cover connector shaft 484*a* extends into cam shaft 480*c*. Cover connector 484 has a corresponding D-shaped geometry to mate with the internal D-shaped geometry of the cam shaft 480*c*. Fastener 482 extends into cover connector shaft 484*a* and through cam shaft 480*c* to secure the two components together. O-ring 485 is placed on the exterior of cover connector shaft 484*a*. On the opposite end of the cam shaft 480*c* fastener 482 extends therethrough to secure opposite end. FIG. 17 shows the sequence of assembling the cam 481. The cam 480 is located within the box 200 while the cover connector 484 is located external to the box and the cover. The o-ring 485 is located between the sidewall 240 and the cover sidewall 420. The cover connector 484 extends through the cover sidewall 420, the o-ring 485 and into the cam 480. The fastener 482 extends into the cover connector 484 and a cap 483 is secured over the cover connector 484. On the other side of the box, a fastener 484 is inserted through the cover 420 and the sidewall 240 of the box. The cap 483 is placed over the fastener 482 and the cover hinge 421. As the cover 420 is rotated the cover connector 484 is rotated. The cover connector includes pins 484*c* which align and mate with the pin holes 421*c* of the cover, such that the pins 484*c* and pin holes 421*c* corroboratively rotate the cover connector 484. The cover connector 484 rotates the cam 480.

Figure 16:
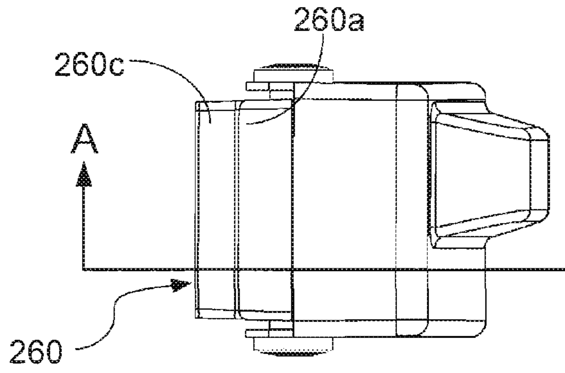
FIG. 16 is a top perspective showing of an electrical box assembly of FIG. 15.
Figure 16A:
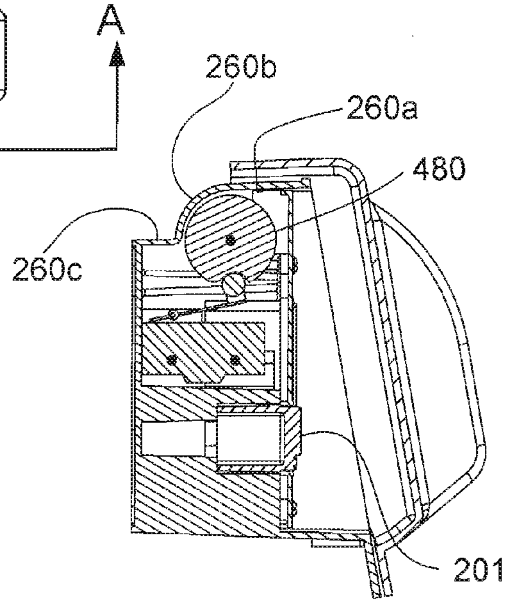
FIG. 16A is a sectional view showing of an electrical box assembly of FIG. 16.

FIGS. 14 and 15 show the box assembly 100 completely assembled. FIG. 14 shows the switch 560 in the power-on position supplying power to the receptacle when the cover 400 is closed. FIG. 35 shows the cover 400 in an opened position, and the switch 560 is in the power-off position. FIGS. 16-16*a* show the switch 560 in the cam divot 480*b* allowing the switch to provide power to the receptacles.

Having described the components of the box of the present invention, its operation may now be described. The box assembly 100 may be attached to wall through which wires and cables (not shown) are typically run. Wires and cables extend through the knockouts in the back wall 600 to supply power to the receptacle. The wires are then attached to the switch 560 and receptacle.

To connect a terminated electrical wire (not shown) to the receptacles 810 and jacks supported within box assembly 100, the cover 200 is pivotally moved to an open position as shown in FIG. 15. Connections can now be made in the conventional fashion to the receptacles 810 and jacks located within the cover 400. The power supply is in the off position when the cover 400 is open. After the connections are made, the wires are run through the openings at the lower sidewall 280 to accommodate the egress of the terminated wires 80 from the box assembly 10. The cover 400 is pivotally closed and may be locked to the box housing 200. When the cover 400 is closed, the power supply is in the power-on position.

It will be appreciated that the present invention has been described herein with reference to certain preferred or exemplary embodiments. The preferred or exemplar embodiments described herein may be modified, changed, added to or deviated from without departing from the intent, spirit and scope of the present invention. It is intended that all such additions, modifications, amendments and/or deviations be included within the scope of the claims appended hereto.

What is claimed is:

1. A electrical box assembly comprising:

(a) a box having an interior defined by a base, and side walls and an open face defined by the sidewalls;

(b) a cover pivotally attached to said box, said cover having an open position and a closed position; and (c) an interlock which supplies power to a receptacle when said cover is in said closed position and terminates power to said receptacle when said cover is in said opened position, said interlock includes a switch and a cam, said cam has a divot therein, one of said switch or said cam is attached to said cover and rotates as said cover pivots between said open position and said closed position, said switch is in contact with said cam, said receptacle is attached to one of said switch or said cam, said switch terminates power to said receptacle when said cover is in the open position, said switch supplies power to said receptacle when said cover is closed.

2. The electrical box assembly of claim 1 wherein said receptacle is attached to said cover.

3. The electrical box assembly of claim 1 wherein said receptacle is attached to said interior of said box.

4. The electrical box assembly of claim 1 wherein said box includes a cutout for an electrical cord to exit through the box assembly when the cover is in said closed position.

5. The electrical box assembly of claim 2 wherein said cam is attached to said cover.

6. The electrical box assembly of claim 2 wherein said switch is attached to said box.

7. The electrical box assembly of claim 6 wherein said switch includes a wheel which extends through said box to contact said cam.

8. The electrical box assembly of claim 3 wherein said box includes a light, said light being sensor activated.

9. The electrical box assembly of claim 8 wherein said cam and said switch are attached to said box.

10. The electrical box assembly of claim 9 wherein said cover includes a cover connector, said cover connector is attached to said cover and extends through said box sidewall and attaches to said cam.

* * * * *